United States Patent [19]

Trump

[11] 4,321,539
[45] Mar. 23, 1982

[54] DIGITAL BFO METAL DETECTING DEVICE WITH IMPROVED SENSITIVITY AT NEAR-ZERO BEAT FREQUENCIES

[75] Inventor: Bruce C. Trump, Saint Joseph, Mich.

[73] Assignee: Zenith Radio Corporation, Glenview, Ill.

[21] Appl. No.: 12,850

[22] Filed: Feb. 16, 1979

[51] Int. Cl.³ .................... G01V 3/11; G01V 3/165
[52] U.S. Cl. ................................. 324/328; 331/37
[58] Field of Search ............... 324/328, 329, 67, 79 D, 324/327, 79 R; 331/37-43, 64, 65

[56] References Cited

U.S. PATENT DOCUMENTS

| | | | |
|---|---|---|---|
| 2,230,502 | 2/1941 | Pearson . | |
| 2,393,717 | 1/1946 | Speaker | 324/328 |
| 2,686,294 | 8/1954 | Hower | 331/37 X |
| 3,325,739 | 6/1967 | Stephenson | 331/37 X |
| 3,355,658 | 11/1967 | Gardiner | 324/328 |
| 3,467,855 | 9/1969 | Rance | 324/328 |
| 3,492,564 | 1/1970 | Baker | 324/328 X |
| 3,519,928 | 7/1970 | Braverman | 324/79 D |
| 3,626,279 | 12/1971 | Walden . | |
| 3,662,255 | 5/1972 | Garrett | 324/328 |
| 3,769,575 | 10/1973 | Rist et al. | 324/329 |
| 3,875,498 | 4/1975 | Mahan et al. | 324/328 |
| 3,909,704 | 9/1975 | Schonstedt . | |
| 3,986,104 | 10/1976 | Randolph | 324/327 |
| 4,016,486 | 4/1977 | Pecori | 324/228 X |

OTHER PUBLICATIONS

Macario, R.C.V., "Discriminative Metal Detector" Wireless World, Jul. 1978, pp. 43-46.
"Make IC Digital Frequency Comparators," Electronic Design, Jul. 5, 1967, pp. 62-64.
"How to Build Proximity Detectors and Metal Locators", 2nd Ed. 1972 pp. 121-128.

Primary Examiner—Gerard R. Strecker
Attorney, Agent, or Firm—Thomas E. Hill; John H. Coult

[57] ABSTRACT

An improved metal detecting device of the beat frequency oscillator type is provided which incorporates a method for determining the side of the zero beat frequency at which a search oscillator is operating. The device includes a search coil conveniently mounted which is part of a search oscillator. A reference oscillator is also provided, the output of which is digitally compared to that of the search oscillator by a digital phase comparator. The digital phase comparator output is applied through a low pass filter to a slope detector circuit. The slope detector output signal is supplied to both an audio output circuit and a filter/comparator. The audio output is sufficient to facilitate location of permeable and conductive substances. The output of the slope detector also contains information which is extracted by the filter/comparator and translated to an audible signal by an oscillator and the audio output circuit. This audible signal serves to facilitate the determination of whether a permeable or a conductive substance is being detected.

10 Claims, 16 Drawing Figures

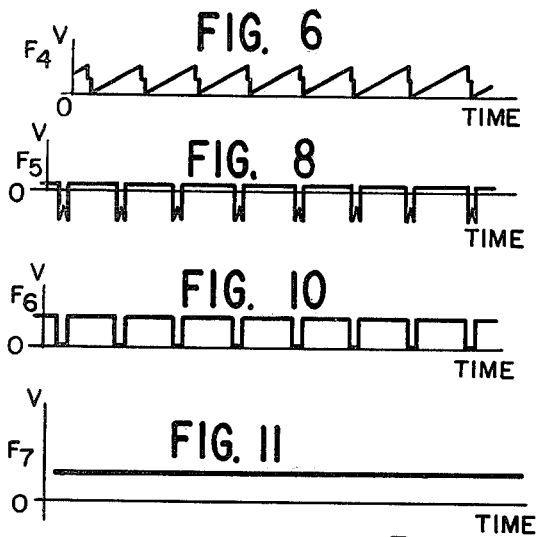
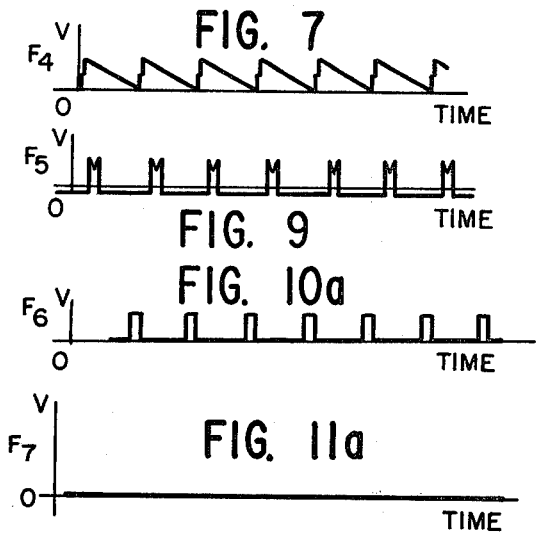
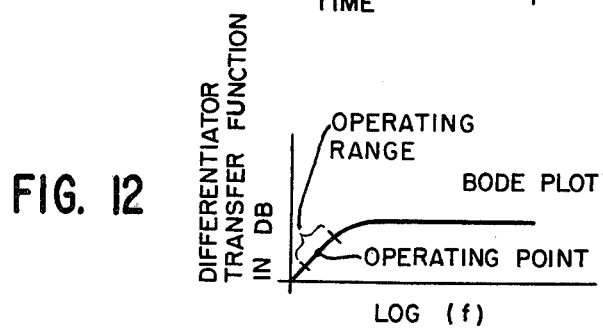
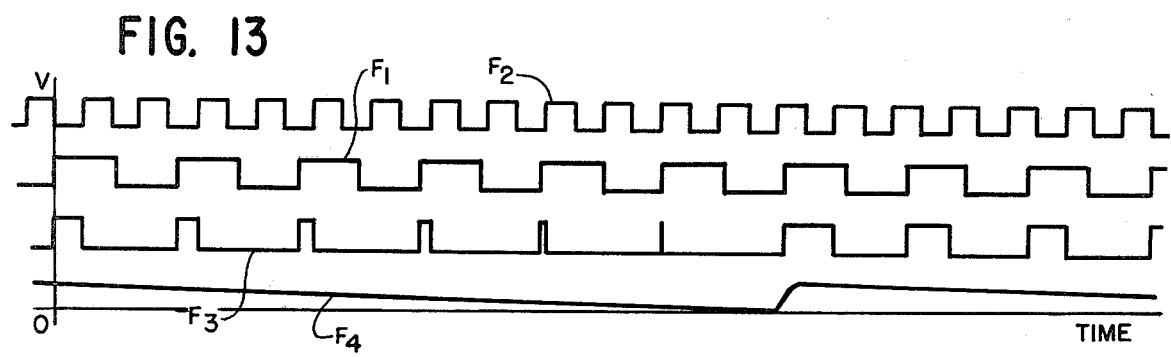
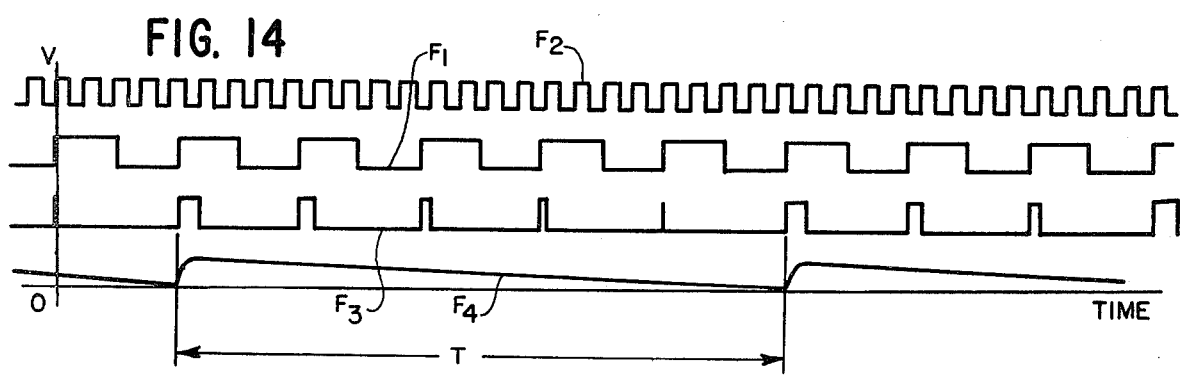

DIGITAL BFO METAL DETECTING DEVICE WITH IMPROVED SENSITIVITY AT NEAR-ZERO BEAT FREQUENCIES

BACKGROUND OF THE INVENTION

1. Field of the Invention

This invention relates to improvements in metal detecting devices. More specifically, it relates to improvements in beat frequency oscillator type metal detectors that provide limited discriminatory capability, enhanced sensitivity, ease of operation and useful features at a low cost.

While the present invention is described herein with reference to particular embodiments, it should be understood that the invention is not limited thereto. The metal detector of the present invention may be adapted and employed for a variety of requirements as those skilled in the art will recognize in light of the present disclosure.

2. Description of the Prior Art

Metal detecting devices of various designs are widely used in the industry. Exemplary of such devices are those shown in the following U.S. Patents: Pat. No. 2,393,717, issued to Speaker on Jan. 29, 1946; Pat. No. 3,325,739, issued to Stephenson on June 13, 1967; Pat. No. 3,467,855, issued to Rance on Sept. 16, 1969; Pat. No. 3,986,104, issued to Randolph on Oct. 12, 1976; Pat. No. 3,355,658, issued to Gardiner on Nov. 28, 1967; Pat. No. 3,769,575, issued to Rist et al. on Oct. 30, 1973; Pat. No. 3,626,279, issued to Walden on Dec. 7, 1971; Pat. No. 2,230,502, issued to Pearson on Feb. 4, 1941; and Pat. No. 3,909,704, issued to Schonstedt on Sept. 30, 1975. Further, *How To Build Proximity Detectors And Metal Locators*, By J. P. Shields, p. 121 (2nd Ed., 1972) is also instructive.

Previously known metal detectors have most often been of one of three types: (1) discriminator, (2) ground neutralization, and (3) beat frequency oscillator (BFO). Discriminator type metal detectors, as typified by the above-mentioned patent to Randolph, No. 3,986,104, are effective to select valuable metals from other metals and utilize the principle that valuable metals such as gold, silver and copper have relatively high conductivity and, as a result, low resistance to eddy currents induced by a search coil. Typically, the eddy currents set up a counter-acting magnetic field which reduces the inductance of the coil. Lower conductivity metals such as steel, iron, aluminum, lead, etc. also produce eddy currents, but reflect higher resistive losses back to the search coil. Discriminators utilize differences in reflected resistive losses to provide discriminative information to the operator.

Ground neutralization type metal detectors are similar to discriminator type detectors but have the capability to neutralize the effect of permeable soil high in mineral, i.e. iron, content. Such detectors generally use some method of combining amplitude and phase shift information between a transmit and receive search coil to yield a signal that does not change with varying proximity to a permeable background. Various circuit techniques have been used to achieve this.

BFO type metal detectors, as typified by the above-mentioned patents to Speaker, No. 2,393,719; Stephenson, No. 3,325,739; Gardiner, No. 3,355,658; Rist et al., No. 3,769,575; Walden, No. 3,626,279; Pearson, No. 2,230,502 and Schonstedt, No. 3,909,704 are employed to find metal where there appears to be none. BFO detectors take advantage of the fact that most conductive or metallic objects, being susceptible to eddy currents, will cause a decrease in the inductance of the search coil and a corresponding increase in the oscillating frequency of a search oscillator, whereas permeable minerals, being unsusceptible to eddy currents, will cause an increase in the inductance of the search coil and a corresponding decrease in the oscillating frequency of the search oscillator. BFO type metal detectors typically examine the difference between the frequency of the search oscillator and that of a fixed frequency reference oscillator and give the user an aural or visual indication of the difference frequency. The user then interprets any changes in the difference frequency as an indication of the presence of a conductive or permeable substance depending on the direction of the frequency shift as the search coil approaches it.

BFO type metal detectors have, in the past, had an undesirable ambiguity in the indication provided thereby under at least some circumstances. In particular, the difference frequency produced thereby increases as the frequency of the search oscillator increases or decreases from the point at which the search oscillator and reference oscillator frequencies are equal. If the search and reference oscillator nominal operating frequencies are sufficiently close together that the actual operating frequencies become equal during operation of the detector, a shift in the frequency of the search oscillator through the zero beat frequency yields a misleading output signal. The output is confusing in that the operator, often unaware of the direction of the frequency shift, will be lead to believe that, for example, a conductive object is being detected when in actuality the search oscillator has rapidly moved to the other side of the zero beat frequency such that the device is sensing a permeable mineral. Thus, a problem has existed as to how to determine whether the output signal corresponds to a beat signal that is at a greater or lesser frequency than that of the zero beat frequency.

SUMMARY OF THE INVENTION

It is therefore a general object of this invention to overcome the problems associated with prior metal detectors of the BFO type.

It is another general object of this invention to provide a metal detector which has greater sensitivity, easier operation, lower cost, and greater capabilities than prior metal detectors.

It is a specific object of this invention to provide an improved metal detecting device which facilitates the determination of whether conductive or permeable substances are being detected.

It is a more specific object of this invention to provide a beat frequency oscillator type metal detector which provides an indication whenever the frequency of the search oscillator is of a predetermined magnitude in relation to a reference frequency.

It is yet another specific object of this invention to provide a beat frequency oscillator type metal detector which differentiates between conductive and permeable substances and employs beat frequency shift multiplication to provide a more audible output signal.

These and other objects and will become apparent upon consideration of the description which follows.

The objects of this invention are achieved by a metal detector which includes a sensing element having electrical characteristics which vary when the element is in the proximity of a permeable or conductive substance. The sensing element is a component of a circuit which generates a first signal of frequency dependent upon electrical characteristics of the sensing element. A second circuit is provided for generating a signal of fixed frequency. The outputs of the first and second circuits are compared by a third circuit. The output of the third circuit is then processed to obtain a signal which represents the change in frequency of the signal generated by the first circuit. The output of the third circuit is also processed to discern whenever the frequency of the output of the first circuit shifts past a predetermined frequency.

DESCRIPTION OF THE DRAWING

FIG. 6 depicts an exemplary filter output waveform where the frequency of the reference oscillator is less than a predetermined multiple of the frequency of the search oscillator;

FIG. 7 depicts an exemplary filter output waveform where the frequency of the reference oscillator is greater than a predetermined multiple of the frequency of the search oscillator;

FIG. 8 depicts an exemplary waveform showing the output of a differentiator when a signal as represented by the waveform of FIG. 6 is passed therethrough;

FIG. 9 depicts an exemplary waveform showing the output of a differentiator when a signal as represented by the waveform of FIG. 7 is passed therethrough;

FIG. 10 shows the waveform of FIG. 8 after it has been amplified and clipped below the zero axis;

FIG. 10a shows the waveform of FIG. 9 after it has been amplified and clipped below the zero axis;

FIG. 11 depicts a waveform representing the average value compared to $\frac{1}{2}$ V of the waveform of FIG. 10;

FIG. 11a depicts a waveform representing the average value compared to $\frac{1}{2}$ V of the waveform of FIG. 10a;

FIG. 12 depicts the general shape of a Bode plot of the differentiator;

FIG. 13 depicts exemplary outputs of the search and the reference oscillators, the phase comparator and the low pass filter where the reference oscillator is at a frequency slightly greater than twice that of the search oscillator; and FIG. 14 depicts the waveforms of FIG. 13 where a reference oscillator is at a frequency slightly greater than four times that of the search oscillator.

DESCRIPTION OF THE PREFERRED EMBODIMENT

Figure 1:
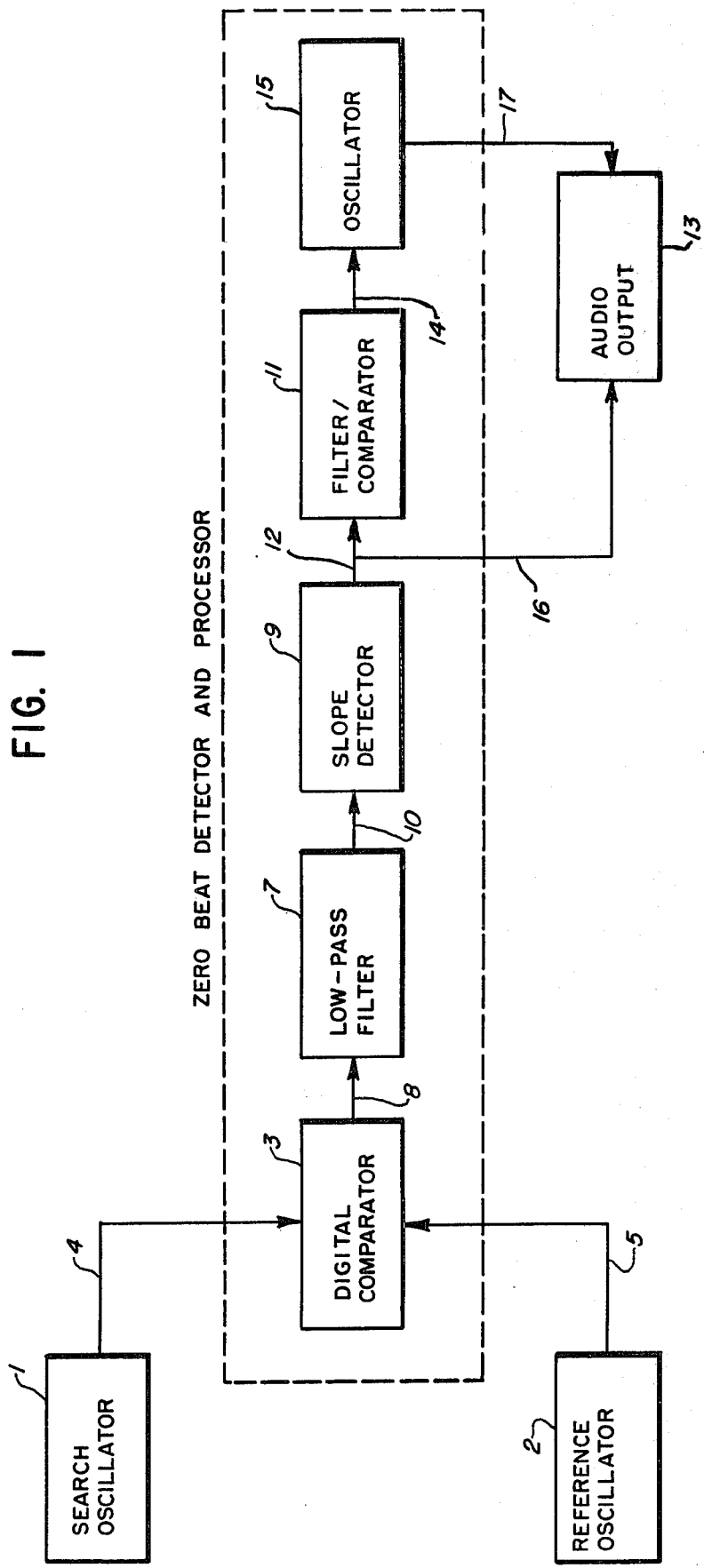
FIG. 1 is a block diagram of a preferred embodiment of this invention.

A preferred embodiment utilizing the principles of this invention is disclosed in the block diagram in FIG. 1. A search oscillator circuit 1 and a reference oscillator circuit 2 are shown having outputs coupled to a digital comparator 3. Not shown in FIG. 1, but included in the search oscillator circuit 1 is an inductive coil 6, see FIG. 2. The coil 6 is typically mounted for convenience at the end of an elongated shaft (not shown) in a conventional manner and is included to provide detection of conductive and/or permeable substances. The inductance of the coil 6 changes as the coil 6 is brought near such substances. A change in the inductance of the coil 6 operates to cause a corresponding change in the frequency of oscillation of the search oscillator 1.

A reference frequency signal is generated by the reference oscillator 2. The frequency of the search oscillator 1 is compared to the reference frequency by digital comparator 3. The digital comparator 3 generates a signal representing the frequency difference between the search and reference signals and applies it to a low pass filter 7 via a line 8. The low pass filter 7 deletes undesirable higher frequencies from the output of the comparator 3 to provide through a line 10 a pulse train to a slope detector 9. The slope detector 9 differentiates and clips the triangular pulse train output of the low pass filter 7 to a rectangular pulse train. The rectangular pulse train output of the slope detector 9 is supplied to an audio output circuit 13 via the line 16. The output of the slope detector 9, when rendered audible by the audio output circuit 13, facilitates the location of a permeable or conductive substance. With this audible signal alone, the operator is capable of determining the presence of permeable or conductive substances, but he is capable of mistaking whether the object of his search, in fact, is permeable or conductive. To provide the operator with less ambiguous indication as to whether the object which is being detected is permeable or conductive, the output of the slope detector 9 is applied to a filter/comparator 11 via line 12. As discussed more fully below, the filter/comparator 11 includes a low pass filter and a comparator which cooperate to extract from the slope at the detector output information relating to which side of the zero beat frequency the search oscillator is operating on and, thus, provide an output which facilitates the determination of whether a permeable or conductive substance is being detected. The output of the filter/comparator 11 controls an oscillator 15 via a line 14. When the operating frequency of the search oscillator deviates past the zero beat frequency, the output of the filter comparator 11 goes high and activates the oscillator 15. The oscillator 15 provides a tone, which when amplified by the audio output circuit, indicates to the operator that the search oscillator has crossed the zero beat frequency and, therefore, a different substance has been detected by the search coil.

Figure 2:
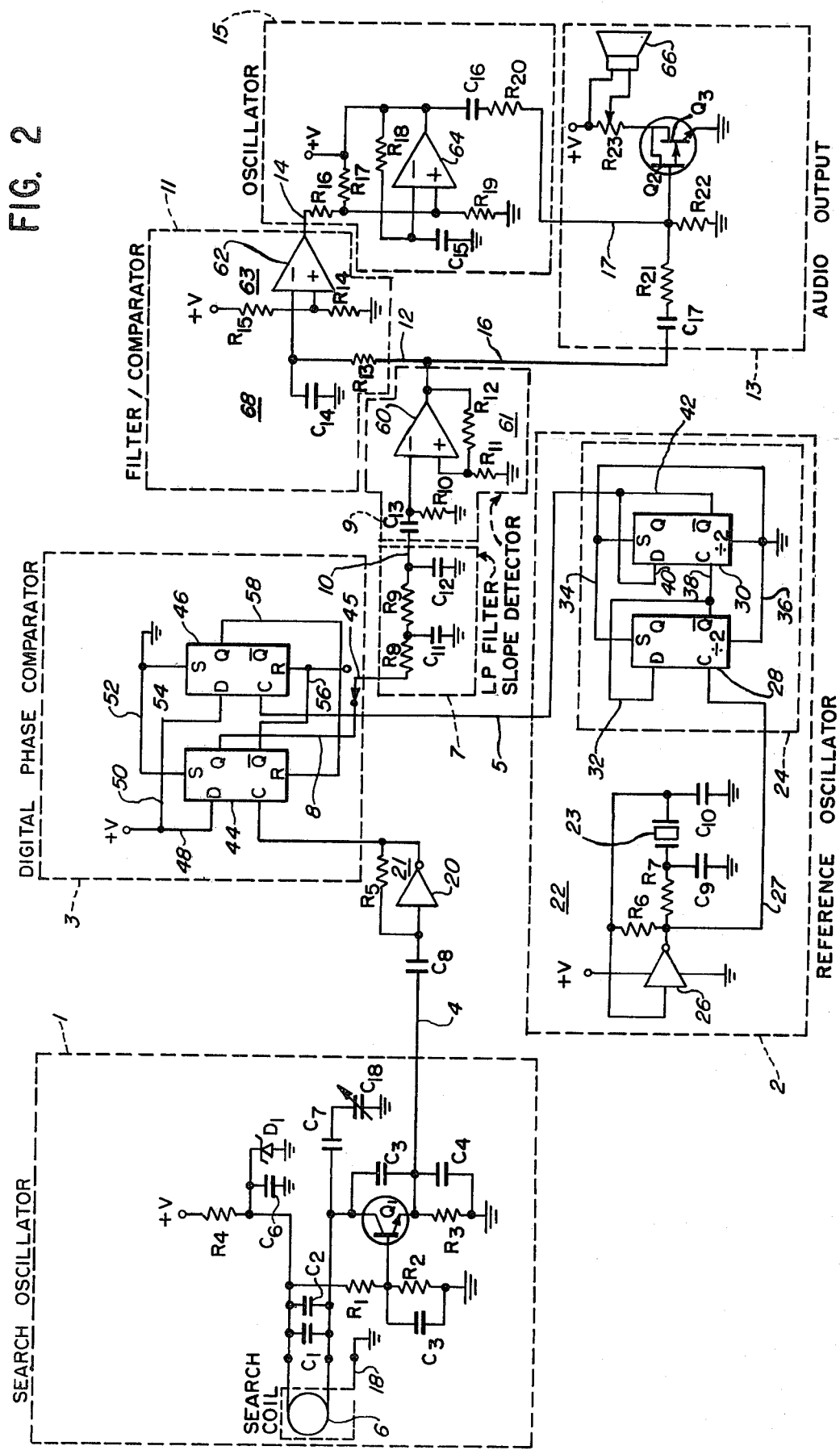
FIG. 2 is a detailed circuit diagram of a preferred embodiment of this invention.

FIG. 2 illustrates the preferred embodiment of the invention in greater detail than FIG. 1. The search oscillator 1 includes the coil 6 as a part of a parallel resonant circuit of common design that determines the operating frequency of the search oscillator 1. The search coil 6 is an air core inductor made by winding a number of turns of wire about a circular form. The diameter of the coil 6 is determined by the size of the objects being searched. The number of turns of the coil 6 is determined by the resonant frequency chosen for the search oscillator 1 and the values of the other components included in the resonant circuit. The search oscillator circuit 1 also includes a variable capacitor C-18 which is operable when adjusted to vary the operating frequency of the search oscillator 1.

As discussed more fully below, the search oscillator nominal frequency is chosen with regard for the frequency of the reference oscillator 2 so that the frequency of the output of reference oscillator 2 is at a multiple N of the nominal frequency of the search oscillator 1.

The search coil 6 is provided with a shield which is grounded by a line 18. The search oscillator 1 is at the nominal operating frequency when the coil 6 is displaced from permeable and conductive objects. As is well understood, metals and minerals being more permeable than air, tend to increase the inductance of the coil 6 and thereby reduce the frequency of the output of search oscillator 1. However, most metals, being also conductive, offer little resistance to the induction therein of eddy currents by the coil 6 which eddy currents set up a magnetic field that opposes that of the coil 6 thereby tending to reduce the inductance of the coil 6 and increase the output frequency of the search oscillator 1. This conductive effect normally results in a net decrease in the inductance of the coil 6 in the presence of highly conductive, metal objects. Thus, the inductance of the search coil 6 is affected differently by its proximity to highly conductive materials versus permeable materials.

The output of the search oscillator 1 is applied to a capacitor C-8 by line 4. An inverter 20, capacitor C-8 and resistor R-5 cooperate as a buffer 21 between the search oscillator 1 and the digital phase comparator 3. The buffer 21 reduces the loading on the search oscillator 1, provides a compatible trigger voltage for the phase comparator 3, and square shapes the output of the search oscillator 1.

The reference oscillator 2 includes a crystal oscillator 22 which operates at a frequency approximately 16 times the nominal frequency of the search oscillator 1. A logic inverter 26 is provided with DC bias by resistor R-6 and AC feedback by R-7, C-9, C-10 and coupled with a crystal 23 to form the crystal oscillator 22. The output from the crystal oscillator 22 is applied to a divider circuit 24 via the lead 27.

The divider 24 is made up of two D-type flip-flops 28 and 30. These flip-flops 28 and 30 transfer a logic level 0 or a logic level 1 present at the data or D input port to the Q output port whenever a 0 to 1 transition takes place at the clock or C input port. Each flip-flop can be arranged to divide an input pulse train by 2 by simply tying the set and reset ports to ground by leads 34 and 36 and tying the $\overline{Q}$ output at each flip-flop to the D input thereof by leads 32 and 42.

When the flip-flops 28 and 30 are coupled as shown in FIG. 2, a signal develops at the $\overline{Q}$ output of the second flip-flop at one-fourth the frequency of the crystal oscillator 22. The output of the crystal oscillator 22 may be divided to provide a reference frequency that is 2, 4, 8 or N (where N is any positive number) times as high as the nominal frequency of the search oscillator 1 without departing from the scope of this invention.

The outputs of the search oscillator 1 and the reference oscillator 2 are applied to the digital phase comparator 3. The phase comparator 3 is two D-type flip-flops 44 and 46 connected as shown in FIG. 2. A high or logic level "1" from a power supply (not shown) is applied to the D input ports of both flip-flops 44 and 46. Each has a zero on its set terminal. The output of the digital phase comparator 3 is taken from the Q output port of the first flip-flop 44 via line 8. The $\overline{Q}$ output port of flip-flop 44 is connected to the reset input port of flip-flop 46. The Q port of flip-flop 46 is connected to the reset port of flip-flop 44. Whenever a positive going pulse appears at the C port of flip-flop 44, the logic level 1 present at the D port is transferred to the Q port and the output line 8. At the same time, a logic level 0 appears at the $\overline{Q}$ output of flip-flop 44 and the reset port R of the flip-flop 46. The Q output of the flip-flop 44 will remain at a logic level 1 until a pulse appears at the C input port of the flip-flop 46. When a 0 to 1 transition appears at the C port of the flip-flop 46, the output of the flip-flop 46 will go to logic level 1 since a logic level 1 is present at the D port. This will cause the flip-flop 44 to be reset. It can readily be seen that the output of the digital phase comparator on line 8 will be at logic level 1 or high when the output from the search oscillator 1 transitions from 0 to 1 and will remain high until the output of the reference oscillator 2 transitions from 0 to 1. When the reference oscillator 2 output goes high, the comparator output 3 goes low. Thus, the duty cycle of the logic level 1 pulse on line 8 is directly proportional to the difference in phase between the signals appearing on lines 4 and 5.

Figure 3:
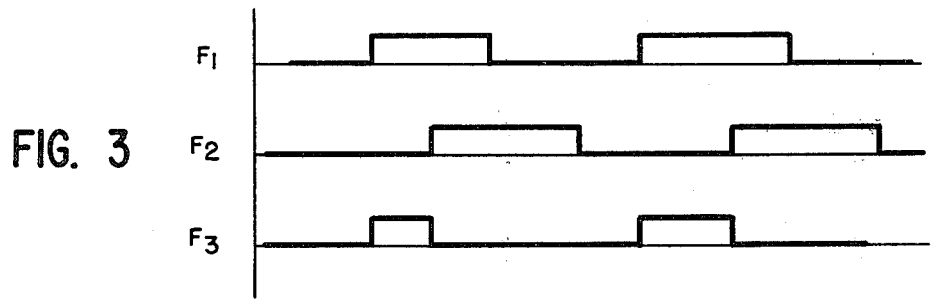
FIG. 3 depicts exemplary waveforms corresponding to the outputs of the search and reference oscillators and the phase comparator shown in FIGS. 1 and 2.

FIG. 3 illustrates the phase relationships of two exemplary input waveforms $F_1$ and $F_2$ and an exemplary output waveform $F_3$ of digital phase comparator 3. $F_1$ represents the output of the search oscillator 1, $F_2$ represents the output of the reference oscillator 2, and $F_3$ represents the output of the comparator 3. In the preferred embodiment, the relationship of the two input frequencies is such that the frequency of $F_2$ is approximately equal to four times that of $F_1$, but for ease of explanation the waveforms $F_1$ and $F_2$ are shown in FIG. 3 with approximately equal frequencies. It can best be seen in FIG. 3 that the output $F_3$ goes high whenever the input $F_1$ goes high and the output $F_3$ goes low, if not already low, whenever $F_2$ goes high. Additional transitions of $F_2$ have no effect once $F_3$ is low. If, as shown in FIG. 3, the frequency of $F_2$ is slightly less than the frequency of $F_1$, $F_3$ will go low slightly later on the second pulse of $F_2$. This results in a second output pulse $F_3$ of slightly greater duration than the first. Similarly, if the frequency of $F_2$ is slightly greater than the frequency of $F_1$, then the subsequent pulses would be of successively narrower duration. If the frequency of $F_2$ is equal to that of $F_1$, the pulse widths of $F_3$ will be uniform. This is the zero beat or synchronized frequency condition. Thus, each successive pulse width is directly related to the phase relationship of the inputs to the phase comparator. As discussed below, this information is utilized to determine which side of zero beat the search oscillator output frequency is on.

Note that since the Q output of the flip-flop 44 for a given frequency of $F_2$ less than N times the frequency of $F_1$ by say X Hertz is identical in duty cycle to the $\overline{Q}$ output of flip-flop 44 for the frequency of $F_2$ greater than N times $F_1$ by X Hertz, a switch 45 is provided for switching between those Q and $\overline{Q}$ outputs. This switch permits the same output to be generated for frequency shifts of the search oscillator through the zero beat frequency in either direction. This allows the unit to be used to search for either conductive or permeable materials with the audible indicator or alarm (discussed below) being activated only when one of those types of materials is detected.

The output of the phase comparator 3 is applied to the low pass filter 7. The low pass filter 7 is composed of resistors R-8 and R-9 and capacitors C-11 and C-12 coupled as shown in FIG. 3. The resistors R-8 and R-9 and the capacitors C-11 and C-12 are chosen so that the filter 7 will have a cutoff frequency much below the frequency of the search oscillator 1 and much above the difference between the reference signal frequency and the search signal frequency multiplied by the integer N. As the width of the output pulses of the phase comparator 3 increases, the voltage appearing at the output of the low pass filter 7, i.e., on line 10, increases. Thus, as the phase angle between the outputs of the search oscillator 1 and the reference oscillator 2 increases, the voltage output of the low pass filter 7 increases. Similarly, as the width of the output pulses of the phase comparator 3 decreases, the voltage output of the low pass filter 7 decreases.

Figure 4:
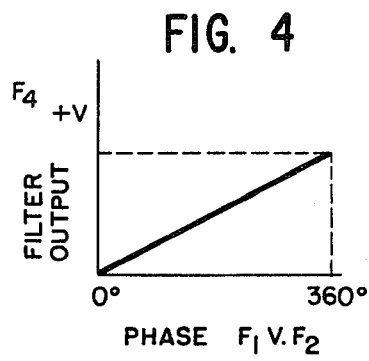
FIG. 4 depicts the output of the low pass filter shown in FIG. 1 as it varies in relation to the phase angle between the outputs of the search and reference oscillators of FIG. 1, when they are near the same frequency.
Figure 5:
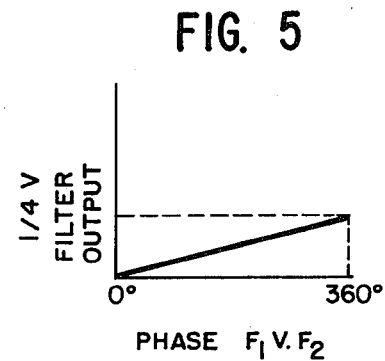
FIG. 5 depicts the same subject matter as shown in FIG. 4 when the reference oscillator is at a frequency four times that of the search oscillator.

FIGS. 4 and 5 depict the output of the filter 7 versus the phase relationship between $F_1$ and $F_2$. FIG. 4 shows that where $F_1$ is approximately equal to $F_2$, that is where $N=1$, the output of the filter $F_4$ varies directly from 0 to $+V$ volts as the phase relationship of $F_1$ and $F_2$ varies. ("V" equals the supply voltage). Similarly, FIG. 5 shows the output of the filter $F_4$ versus the phase relationship of $F_1$ and $F_2$ where, as in the preferred embodiment, $F_2$ is approximately equal to 4 times $F_1$. In this case, the maximum value of $F_4$ is $V/4$. This is due to the fact that the comparator output $F_3$ pulses are shortened by the increased rapidity by which the $F_2$ pulse arrives. Accordingly, the maximum width of an $F_3$ pulse is equal to the reciprocal of the frequency of $F_2$, which occurs when the frequency of $F_1 =$ the frequency of $F_2/N$. (In the preferred embodiment $N=4$.)

The filter output $F_4$ varies with the phase relationship of $F_1$ and $F_2$. The phase relationship of $F_1$ and $F_2$ varies in time whenever the frequency of $F_1$ is not exactly equal to the frequency of $F_2$ divided by N. In FIG. 6, $F_4$ is shown versus time where the frequency of $F_1$ is greater than the frequency of $F_2$ divided by N. FIG. 7 shows the filter output $F_4$ where the frequency of $F_1$ is less than the frequency of $F_2$ divided by N. The slope of the waveforms of the FIGS. 6 and 7 differs because, as mentioned above, when the frequency of $F_1$ is greater than $F_2$ divided by N, the pulses of the comparator output $F_3$ become successively longer per period; whereas the opposite is true where frequency of $F_1$ is less than frequency of $F_2$ divided by N. Accordingly, when the frequency of $F_1$ is greater than the frequency of $F_2$ divided by N, the output voltage of the filter 7 increases with time. Whereas, when the frequency of $F_1$ is less than the frequency of $F_2$ divided by N, the output voltage of the filter 7 decreases with time.

As discussed more fully below, the polarity of the slope of $F_4$ is utilized in the determination of the side of the zero beat frequency at which the search oscillator is oscillating.

FIGS. 13 and 14 show illustrative outputs of the search oscillator 1 ($F_1$), the reference oscillator 2 ($F_2$), the digital comparator 3 ($F_3$), and the low pass filter 7 ($F_4$) where the frequency of $F_2$ is greater than N times the frequency of $F_1$. FIG. 13 shows the outputs where $N=2$, and FIG. 14 shows the outputs where $N=4$. Note that $F_3$ and $F_4$ have a period, T, between $F_3$ pulses of equal duration. The smoothing effect of the low pass filter 7, the output of which is depicted as $F_4$ in FIGS. 13 and 14, has been exaggerated for clarity. In FIGS. 13 and 14 the variations in the relative frequencies of $F_1$ and $F_2$ have also been exaggerated for clarity. In operative embodiments of this invention, the frequency shift in $F_1$ caused by the presence of highly permeable or conductive substances would rarely exceed one percent of the frequency of $F_1$ so that there are actually many more cycles of $F_1$ for each cycle of $F_4$ than are shown in FIGS. 13 and 14. Note that the filtered output of $F_4$ gradually falls, then quickly resets to V/N as the pulses of $F_3$ again become long. As N is increased for small frequency shifts of $F_1$, the period (T) of $F_3$ and $F_4$ is shortened proportionately. In other words, the frequency of $F_3$ and $F_4$ is proportionately increased. This effectively multiplies any frequency shift, $\Delta F_1$, in $F_1$ so that the frequency shift in $F_4$ is N times $\Delta F_1$. Since $F_4$ is further processed for audible indication of frequency shift, this multiplication yields a signal more easily detected for very small frequency shifts.

Referring to FIG. 2, the output of the low pass filter 7 is coupled to the slope detector 9 by line 10. The slope detector 9 is essentially a high pass filter including capacitor C-13 and resistor R-10 which acts as a differentiator and a Schmitt trigger circuit which includes amplifier 60, and resistor R-11 and R-12 and acts as a comparator. A Bode plot of a differentiator is shown in FIG. 12. Differentiation occurs only on the upward sloping portion of the plot. This is the operating range of the differentiator. The R-C time constant of the differentiator is chosen to achieve effective differentiation at an operating point in a range corresponding to the range of frequencies of the output of the digital phase comparator 3. When $F_4$ as shown in FIGS. 6 and 7 is differentiated, pulse trains $F_5$, as shown respectively in FIGS. 8 and 9 result. Note that in FIG. 8 part of the waveform is slightly above the zero axis. If the positive half of the waveform were amplified and the negative half rejected, the waveform as shown in FIG. 10 would result. This is accomplished by the comparator circuit.

The output of the differentiator as typified in FIG. 8 is applied to the inverting input of the amplifier 60, which is biased by resistor R-11 to compare with ground. A small amount of positive feedback or hysteresis has been added by resistor R-12 to provide some noise rejection. A typical output of the comparator circuit for the case where the frequency of $F_1$ is slightly greater than the frequency of $F_2$ divided by N is shown in FIG. 10. The output of the comparator would be inverted above the zero axis if the search oscillator frequency is on the permeable side of the zero beat, as shown in FIG. 10a.

If the signal represented in FIG. 10 were passed through a low pass filter and compared to $\frac{1}{2}$ V, the waveform shown in FIG. 11 would result. This almost steady state D-C level corresponds to a logic level 1 output. By a similar analysis averaging and comparing, the signal represented in FIG. 10a results in the waveform shown in FIG. 11a. In this way, a logic level output can be obtained which is dependent upon the slope of the $F_4$ waveform. Since the slope of the $F_4$ cycle is dependent on which side of the zero beat frequency the search oscillator is oscillating, it is readily apparent that this method yields a logic level signal dependent on the frequency of $F_1$ vis-a-vis the zero beat frequency. As discussed below, these steps are achieved by the filter/comparator circuit.

The filter/comparator circuit includes a low pass filter 68, and a voltage comparator 63. The output of the slope detector 9 is applied to the low pass filter portion 68 of the filter/comparator 11 via line 12. The low pass filter circuit 68 includes a capacitor C-14 and a resistor R-13. The low pass filter 68 operates to average the square wave output from the slope detector 9 such that a voltage greater or less than $\frac{1}{2}$ V is obtained. Resistor R-13 and capacitor C-14 are chosen so that the filter 68 has a very low cut-off frequency. The lower limit on the cut-off frequency of the filter 68 derives from the fact that the filter 68 must be fast enough to respond to rapid changes in the difference frequency to provide an indication to the operator. The output of the low pass filter network 68 is then applied to the comparator 63. The comparator 63 includes a second operational amplifier 62 biased by a voltage divider network in such a way that whenever the voltage appearing at the inverting terminal is greater than one-half V, a logic level 1 appears at the output of the operational amplifier 62 and whenever a voltage appears at the inverting terminal of less than one-half V, a logic level 0 appears at the output of the operational amplifier 62. This biasing arrangement is accomplished by using biasing resistors R-14 and R-15 of equal value.

Whenever the output of operational amplifier 62 is at a logic level 1, the alarm oscillator 15 is activated via line 14. The alarm oscillator 15 utilizes an operational amplifier 64. Its design is known in the art and will not be detailed here.

The alarm oscillator 15 is coupled to the audio output circuit 13 by line 17. A second input to the audio output circuit is provided by the slope detector 9 via line 16. This connection allows a signal at the frequency of the slope detector output and the alarm to be audible to the operator. The design of the audio output circuit is known in the art and will not be discussed here.

In operation, the operator would set the conductive permeable switch 45 to the desired position. Preferably the switch 45 settings would have been previously labeled at the time the device was assembled. As mentioned above, setting the switch 45 allows the operator to determine whether the alarm will be activated or the conductive or the permeable side of zero beat.

Next, the operator adjusts the variable capacitor C-18 to set the output of the search oscillator at a nominal frequency such that a conventionally discernible output signal is available to be monitored.

Subsequently, the operator moves the search coil 6 over the ground in a sweeping motion. The movement of the search coil 6 in the vicinity of a permeable or conductive substance causes a shift in the output frequency of the search oscillator. The output of the search oscillator is compared to that of the reference oscillator and the shift is noted by the digital comparator 3. The output of the digital comparator 3 is a waveform corresponding to the frequency difference between the outputs of the search oscillator 1 and the refernce oscillator 2. Its frequency varies as the search coil is brought closer to the subject substance. The low pass filter 7 integrates the digital output of the comparator 3 to provide waveforms composed of a sequence of ramp-up or ramp-down triangular shapes. The low pass filter output is then differentiated and clipped by the slope detector 9 to provides a train of positive pulses of duty cycle dependent on the slope of the input pulses. The output of the slope detector 9 is then averaged to provide a D-C level by a low pass filter network 68 and reduced to a logic level 1 or logic level 0 by another comparator 63. Whenever a logic level 1 is present at the output of comparator 63 it is an indication that the detector has suddenly detected an object that has caused the difference frequency to shift from a predetermined side of the zero beat frequency to the other. This logic 1 output triggers an oscillator 15 which cooperates with the audio output circuit 13 to provide an alarm tone to the operator. Concurrently the sound of the frequency representing the difference frequency is fed from the output of the slope detector 9 to the audio amplifier 13. The frequency of this pulsating output is dependent upon the proximity of the search coil 6 to the object. Thus, the operator is able to hear both the pulsating output of the slope detector 9 permitting him to make decisions based upon the increase or decrease in the rapidity of the pulses as to whether he is in proximity to a permeable or conductive substance and the alarm tone permitting him to determine whether the substance he is approaching is a permeable or conductive one.

One embodiment of this invention constructed in accord with the circuit diagram of FIG. 2 had a nominal searc oscillator frequency of approximately 224 KHertz, which frequency was shifted by amounts on the order of approximately one percent by the presence of highly permeable or conductive substances in the vicinity of the search coil 6, had a reference oscillator frequency of approximately 895 KHertz, used portions of an LM324 quad operational amplifier available from National Semiconductor Corporation for amplifiers 60 and 62, and included components having the circuit values indicated in the following:

| | |
|---|---|
| R8, R9, R10 | 10 Kohms |
| R11 | 1 Kohm |
| R12, R14, R15 | 1 Megohm |
| R13 | 3.3 Megohms |
| C11, C12 | 0.001 μfarads |
| C13 | 0.05 μfarads |
| C14 | 0.005 μfarads |

While a preferred embodiment of this invention has been described, it will be understood that the invention is not limited thereto. Considering the foregoing teachings, modifications may be made within the scope of this invention by one of ordinary skill in the art to which this invention pertains. For example, the invention may be designed utilizing the teachings of this invention so that the reference oscillator has a frequency 2, 8, 16 or N times that of the search oscillator nominal frequency. Further, substitution of alternative circuit configurations for the search, reference, or alarm oscillator circuits, the phase comparator, or the audio output circuits is within the ambit of this invention.

Similarly, the configuration or cut-off frequency of the high and low pass filters may be altered without departing from the scope of this invention. Still further, the type of indicator used to show reversal of side of zero beat could easily be modified to be, for example, visual.

It is contemplated by the appended claims to cover any modification and any other embodiment which constitutes the salient features of this invention.

What is claimed is:

1. A metal detector with a housing, comprising:
   first means having electrical characteristics which vary when said first means is in the proximity of either a permeable or conductive substance;
   second means for generating a first signal having a nominal frequency dependent upon the electrical characteristics of said first means;
   third means for generating a second signal of fixed frequency;
   fourth means for comparing said second signal of fixed frequency with said first signal;

fifth means for processing the output of said comparing means to obtain a third signal representing the change in the frequency of said first signal, said third signal indicating the proximity of either a permeable or a conductive substance;

sixth means coupled to said fifth means for processing said third signal to obtain a fourth signal representing the shift of the frequency of said first signal past a predetermined frequency relative to the frequency of said second signal, said frequency shift signal indicating whether the substance detected is either permeable or conductive; and seventh means coupled to said fifth and sixth means for providing audible indications of said third and fourth signals.

2. The metal detector of claim 1 wherein said second means includes a tuned oscillator.

3. The metal detector of claim 2 wherein said tuned oscillator includes means for varying the nominal operating frequency thereof.

4. The metal detector of claim 1 wherein the fixed frequency of said second signal generated by said third means is approximately equal to a predetermined multiple of said nominal operating frequency of said first time varying signal.

5. The metal detector of claim 1 wherein said fourth means includes a digital phase comparator.

6. The metal detector of claim 1 wherein said fifth means includes a filter having a cutoff frequency below the frequency of said first signal and above the difference between the frequency of said second signal and a predetermined multiple of said nominal operating frequency of said first signal.

7. A metal detector with a housing, comprising:
first means having electrical characteristics which vary when said first means is in the proximity of either a permeable or conductive substance;
second means for generating a first signal having a nominal frequency dependent upon the electrical characteristics of said first means;
third means for generating a second signal of fixed frequency;
fourth means for comparing said second signal of fixed frequency with said first signal;
fifth means for processing the output of said comparing means to obtain a third signal representing the change in the frequency of said first signal, said third signal indicating the proximity of either a premeable or a conductive substance; and
sixth means coupled to said fifth means for processing said third signal to obtain a fourth signal representing the shift of the frequency of said first signal past a predetermined frequency relative to the frequency of said second signal, said frequency shift signal indicating whether the substance detected is either permeable or conductive, said sixth means including:
means for differentiating said third signal from said fifth means;
means for comparing the output of said differentiator to a predetermined signal level;
means for averaging the output of said comparing means to derive an averaged signal; and
means for ascertaining whether said average signal is above or below said predetermined frequency relative to the frequency of said second signal whereby the shift of frequency of said first signal past said predetermined frequency in one direction is represented by a digital logic signal of a first state while a frequency shift of said first signal in the opposite direction is represented by a digital logic signal of a second state.

8. A metal detector with a housing, comprising:
first means having electrical characteristics which vary when said first means is in the proximity of either a permeable or conductive substance;
second means for generating a first signal having a nominal frequency dependent upon the electrical characteristics of said first means;
third means for generating a second signal of fixed frequency;
fourth means for comparing said second signal of fixed frequency with said first signal, said fourth means including a digital phase comparator;
fifth means for processing the output of said comparing means to obtain a third signal representing the change in the frequency of said first signal, said third signal indicating the proximity of either a permeable or a conductive substance;
sixth means coupled to said fifth means for processing said third signal to obtain a fourth signal representing the shift of the frequency of said first signal past a predetermined frequency relative to the frequency of said second signal, said frequency shift signal indicating whether the substance detected is either permeable or conductive; and
selectable switch means coupled to said fourth means for providing a first output signal from said digital phase comparator when the frequency of said first signal is increasing in value as it passes said predetermined frequency to indicate the presence of conductive material or for providing a second output signal from said digital phase comparator when the frequency said first signal is decreasing in value as it passes said predetermined frequency to indicate the presence of permeable material.

9. A metal detector with a housing, comprising:
first means having electrical characteristics which vary when said first means is in the proximity of either a permeable or conductive substance;
second means for generating a first signal having a nominal frequency dependent upon the electrical characteristics of said first means;
third means for generating a second signal of fixed frequency approximately equal to a predetermined multiple of said nominal operating frequency of said first time varying signal;
fourth means for comparing said second signal of fixed frequency with said first signal;
fifth means for processing the output of said comparing means to obtain a third signal representing the change in the frequency of said first signal, said third signal indicating the proximity of either a permeable or a conductive substance;
sixth means coupled to said fifth means for processing said third signal to obtain a fourth signal representing the shift of the frequency of said first signal past a predetermined frequency relative to the frequency of said second signal, said frequency shift signal indicating whether the substance detected is either permeable or conductive with said sixth means including:
means for differentiating said third signal from said fifth means;
means for comparing the output of said differentiator to a predetermined signal level;

means for averaging the output of said comparing means to derive an averaged signal; and means for ascertaining whether said averaged signal is above or below said predetermined frequency relative to the frequency of said second signal whereby the shift of frequency of said first signal past said predetermined frequency in one direction is represented by a digital logic signal of a first state while a frequency shift of said first signal in the opposite direction is represented by a digital logic signal of a second state.

10. A metal detector with a housing, comprising:

first means having electrical characteristics which vary when said first means is in the proximity of either a permeable or conductive substance;

second means for generating a first signal having a nominal frequency dependent upon the electrical characteristics of said first means, said second means including a tuned oscillator having adjustable means for varying the nominal operating frequency thereof;

third means including a reference oscillator for generating a second signal of fixed frequency approximately equal to a predetermined multiple of said nominal operating frequency of said first time varying signal;

fourth means including a digital phase comparator for comparing said second signal of fixed frequency with said first signal;

fifth means for processing the output of said comparing means to obtain a third signal representing the change in the frequency of said first signal, said third signal indicating the proximity of either a permeable or a conductive substance with said fifth means including a filter having a cutoff frequency below the frequency of said first signal and above the difference between the frequency of said second signal and said predetermined multiple of said nominal operating frequency of said first signal;

sixth means coupled to said fifth means for processing said third signal to obtain a fourth signal representing the shift of the frequency of said first signal past a predetermined frequency relative to the frequency of said second signal, said frequency shift signal indicating whether the substance detected is either permeable or conductive with said sixth means including:

means for differentiating said third signal from said fifth means;

means for comparing the output of said differentiator to a predetermined signal level;

means for averaging the output of said comparing means to derive an averaged signal; and means for ascertaining whether said averaged signal is above or below said predetermined frequency relative to the frequency of said second signal whereby the shift of frequency of said first signal past said predetermined frequency in one direction is represented by a digital logic signal of a first state while a frequency shift of said first signal in the opposite direction is represented by a digital logic signal of a second state; and seventh means coupled to said fifth and sixth means for receiving said third and fourth signals, respectively, and for providing audible indications thereof.

* * * * *